March 16, 1926.
C. M. HACKENBERGER
1,576,969
DANDELION DIGGER
Filed Oct. 9, 1925
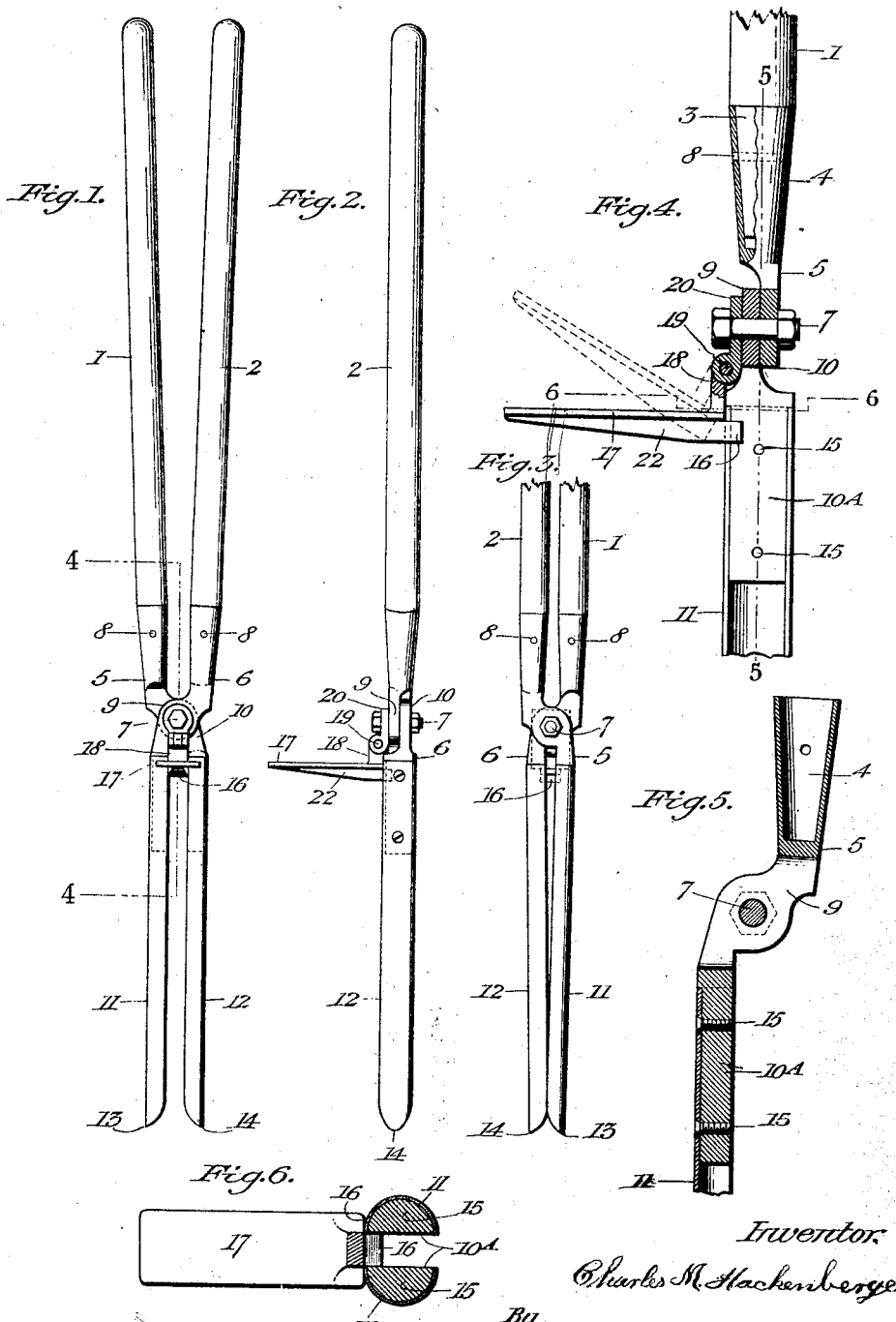
Inventor.
Charles M. Hackenberger.
By H. S. Bailey, Attorney.

Patented Mar. 16, 1926.

1,576,969

UNITED STATES PATENT OFFICE.

CHARLES M. HACKENBERGER, OF DENVER, COLORADO.

DANDELION DIGGER.

Application filed October 9, 1925. Serial No. 61,542.

*To all whom it may concern:*

Be it known that I, CHARLES M. HACKENBERGER, a citizen of the United States of America, residing at the city and county of Denver, and State of Colorado, have invented a new and useful Dandelion Digger, of which the following is a specification.

My invention relates to a new type dandelion digger.

The object of the invention is to provide an implement for pulling dandelions and other weeds, in the form of tongs having half tubular blades secured to their gripping ends which are adapted to be inserted in the ground so as to surround a root, and then grip the root in order to extract the same, means being provided for defining a space between the root gripping blades while they are being inserted in the ground around said root.

Further, to provide a root pulling tongs, the gripping ends of which have extended half tubular root-gripping blades secured thereto, a hinge member being secured to the pivot bolt of said tongs and a step being pivotally secured to said hinge member to receive foot pressure in inserting said blades in the ground, said step having a heel which normally lies between said blades to hold them apart while they are being forced in the ground said step being adapted to be swung up to withdraw the heel from between the blades after they have been inserted in the ground, whereby they may be forcibly closed upon a root in order to extract the same.

I attain these objects by the implement illustrated in the accompanying drawings, in which:

Fig. 1, is a front elevation of a dandelion digger embodying my invention and showing it with its ground entering and dandelion surrounding members in the position in which they are held by the hands of the operator when pressed into the ground around the roots of a dandelion.

Fig. 2, is a side elevation of my dandelion digger and of Fig. 1.

Fig. 3, is a front elevation of my dandelion surrounding half tubes showing their lower ends closed in substantially in the position they are closed to when they are closed around the root of a dandelion.

Fig. 4 is an enlarged sectional view of the pivotal joint and its pivotally swinging foot pressure step which is arranged to close the dandelion surrounding tubes in parallel ground entering position, and to be moved to allow them to be closed around the roots of a dandelion.

Fig. 5, is a sectional view through one of the handle members of my dandelion digger, showing the preferred manner of removably securing the half tubular ground entering and dandelion surrounding half tubes to the handles below their pivotal joints, and Fig. 6, is a horizontal section on line 6 of Fig. 4.

Similar letters of reference refer to similar parts throughout the several views.

Referring to the drawings the numerals 1 and 2 designate the two hand holding handles of the dandelion digger.

These handle members are preferably made of wood, but can be made of metal rods or tubes if desired, and they are made of different lengths to enable short and tall boys and men to conveniently handle them when pressing the dandelion digger by the pressure of the foot of the operator into the ground around the root of the dandelion, as will be fully explained hereinafter.

The lower ends 3 of the two wooden handles are tapered as shown and are fitted tightly into tapering sockets 4 that are formed in the upper ends of pivotally hinged iron, steel or other metal members 5 and 6 that cross each other and are pivotally connected together by a pivotal bolt 7, and the tapering ends 3, of the handles are secured in the tapering apertures of the metal hinged members by any suitable means preferably by rivets 8.

The metal hinged members 5 and 6 are each provided with flattened portions 9 and 10 where they cross each other through which the pivotal bolt 7 extends and a metal portion $10^A$ depends from each pivotal joint forming flattened portions for a short distance to each of which I secure the upper end of a dandelion digging chisel or spade member each of which 11 and 12, I preferably make of a substantial half round or half tubular form in cross section and they are preferably made of tool steel, and their terminal edges 13 and 14 are sharpened to cutting edges and are preferably hardened.

The upper ends of these half round ground chisels, extend around the depending lower ends of the pivotal hinged members which are formed into half round shapes on their outside surfaces that fit inside of the half round upper ends of the ground chisels and they are secured removably together by any suitable means preferably by rivets 15 as shown in Figs. 4 and 5 which can be easily removed and a new chisel attached to a pivotal hinged joint member in case a chisel from any cause is broken.

In Fig. 1, the dandelion digging chisels are illustrated at a short distance apart throughout their length, they consequently stand substantially parallel to each other as illustrated, and the handles at their upper end are held at such a distance apart as will hold the chisels in this parallel position to each other by the heel end 16 of a foot pedal 17 that is pivotally secured by a hinged eye portion 18, that is formed integrally to project from the rear end of the pedal and is pivotally hinged by a pin member 19 to a hinge plate 20 that is mounted on the pivotal bolt of the metal hinge members 5 and 6.

The pedal comprises a narrow plate that projects far enough from the upper end of the chisel member, for a foot of the operator to bear on, and its rear end portion 21 is wide enough to bear against both of the upper ends of the tubular members; while its heel portion 16, forms a projecting end of a rib member 22 that is formed on the under side of the pedal, and this heel portion is made of a thickness to project easily between the upper ends of the tubular members; when the foot pedal is standing outwardly at right angles to the side of the tubular member in which position the pedal is hanging loosely from its pivotal pin and from the hinge plate that is mounted on the pivotal bolt of the handles and the rear end of its flat portion bears against the top ends of the chisels, and its heel member projects between them; consequently it is stopped and held against any further downward movement by its rear ends of its rear end plate portion bearing against the two ends of the front portion.

Consequently, in this position, the operator grasps the handles and holds them to clamp the chisel against the heel of the pedal which holds the chisel at an equal distance apart throughout their lengths and this distance that they are held apart is just wide enough to go over the ground surface end of a large dandelion in a position to surround it, then the operator places one of his feet on the pedal and presses the chisels into the ground around the dandelion and has the terminal end of the chisels sharpened so that they penetrate the ground easily, the circular part closing around the root of the dandelion; and when they have been pressed into the ground up to the pedal, the pedal is swung upwardly so that it stands parallel with the length of the handles and chisel into which position it is swung on its pivot end 18 by a hand of the operator or his foot, and when moved upward into this position its heel member swings out from between the half round tubular shaped chisels, and then the operator can press the upper ends of the handles towards each other until the lower terminal ends of the chisels embrace the root of the dandelion and hold them firmly there, and then pull the chisels up out of the ground with the dandelion root planted firmly between their half tubular shaped ends.

In inserting or otherwise pushing the chisel into the ground the dirt immediately around the root of the dandelion is enclosed by the half round tubular chisels and when the chisels are closed around the root the dirt is clamped lightly around the root and is removed with the root when the chisels are withdrawn from the ground.

The chisels can be made of any determined length. I preferably make them 12 inches long but they can be made a little shorter if desired.

My dandelion digger is very easily pressed into the ground, because its chiseled edges are sharpened and it is made of a diameter that it makes only a small hole in the ground, but it exerts sufficient pressure around the roots of the very longest dandelion and removes them quickly and easily from the ground.

My dandelion digger is especially adapted to pull any character of a weed or weeds that is desired to be removed from the ground, and it can also be made in size that would allow small plants or stocks of grain or the stocks of various growing flower or food plants to be removed from the ground if it were desired to transplant or to examine their roots; and it provides a very simple, easily operated dandelion and other root digger, and is put before the public at very small cost and can be operated by boys or men.

Having described my invention what I claim as new and desire to secure by Letters Patent is:

1. In an implement of the character described, a pair of tongs, the working ends of which are semi-tubular in cross section and pointed, a pivoted element which in one position defines a space between said working ends when the handles are moved toward each other and which in another position permits the extremities of said working ends to engage.

2. In an implement of the character described, a pair of tongs, the working ends of which are provided with semi-tubular blades which are pointed, a hinged step on said tongs having a portion adapted to extend between said working ends and define a space between said blades when the handles are moved toward each other said blades being permitted to come together when said step is swung to an inoperative position.

3. In an implement of the character described, a pair of tongs the gripping ends of which have secured thereon semi-tubular pointed blades, a hinged step on said tongs having a heel which is adapted to extend in between said gripping ends to define a space between said blades when the handles are nearly closed, and which permits said blades to come together, when said step is swung upward.

4. In a root pulling implement, the combination with a pair of tongs and their pivot bolt, of semi-tubular pointed blades which are secured upon the gripping ends of said tongs, a hinge member secured to said tongs by said pivot bolt, a step pivotally connected to said hinge member, having a heel which normally lies between said gripping ends to define a space between them when the handles are nearly closed, and which permits said blades to come together when the step is swung upward, said step being pressed upon by the foot to insert said blades in the ground.

5. The herein described dandelion digger which consists of a pair of dandelion embracing chisel pointed half tubes provided with supporting handles, and a foot pressing member at their upper ends arranged to be moved into and out of foot engaging relation of an operator, and arranged to hold the half tubes at a predetermined distance apart throughout the length of the dandelion diggers; said handle members being removably secured to said dandelion digger half tubes and arranged to close said half tubes around the lower ends of the roots of dandelions.

6. In an implement of the character described, the combination with a pair of tongs and their pivot bolt, said tongs having half tubular blades secured to their gripping ends; of a hinge member secured to said tongs by said pivot bolt, a step having a hinge portion pivotally secured to the first hinge member, the inner end of said step being adapted normally to abut against the said gripping ends, said inner end having a heel portion adapted to normally lie between said gripping ends, to hold said half tubes in spaced relation.

In testimony whereof I affix my signature.

CHARLES M. HACKENBERGER.